UNITED STATES PATENT OFFICE.

MAXIMILIAN CARL LUDWIG ALTHAUSSE, OF BILLWÄRDER-AN-DER-BILLE, GERMANY, ASSIGNOR TO FABRIK CHEMISCHER PRAEPARATE VON DR. RICHARD STHAMER, OF HAMBURG, GERMANY.

PROCESS OF OBTAINING HYDROCELLULOSE.

SPECIFICATION forming part of Letters Patent No. 679,203, dated July 23, 1901.

Application filed August 27, 1900. Serial No. 28,199. (No specimens.)

*To all whom it may concern:*

Be it known that I, MAXIMILIAN CARL LUDWIG ALTHAUSSE, a subject of the German Emperor, and a resident of Billwärder-an-der-Bille, near Hamburg, in the German Empire, have invented a certain new and useful Improvement in the Process of Obtaining Hydrocellulose, of which the following is a specification.

My invention has relation to the manufacture of hydrocellulose; and it has for its object an improved process whereby the cost of manufacture is materially reduced and a product obtained having properties not possessed by the hydrocellulose obtained from well-known processes.

Vignon, in *Comptes Rendus*, Vol. 125, page 448, Vol. 126, page 1355, and Vol. 127, page 872, describes processes of obtaining oxycellulose by reacting upon cellulose with hydrochloric acid and with chlorate of potassium. In these processes the oxycellulose is formed directly from the cellulose by absorption of oxygen, the hydrochloric acid and potassium chlorate acting simply as oxidizing agents. This is conclusive from the fact that by reacting upon cellulose with hydrochloric acid only a hydrocellulose is obtained whose properties, however, differ materially from those of the oxycellulose of Vignon, as described in Beilstein's *Handbuch der Chemie*, third edition, beginning at the foot of page 1077. On the other hand, Girard also describes in the *Annales de Chemie et de Physique*, fifth series, Vol. 24, pages 348 to 350, a process of obtaining hydrocellulose by reacting upon cellulose with hydrochloric acid only, in which he states that the period of reaction depends greatly upon the temperature at which the reaction is carried out and that higher temperatures will accelerate the reaction somewhat, while lower temperatures will retard the same, and he states that a temperature of from 60° to 70° is especially to be recommended (page 348) and that several hours are necessary to the complete conversion of the cellulose.

After extensive experiments with the Vignon and other processes referred to I have discovered that the addition of potassium chlorate, if properly proportioned, will not only accelerate the reaction (when carried out at a suitable temperature) to a remarkable degree, but will result in the production of a hydrocellulose of special chemical properties and free from oxycellulose, the reaction setting in immediately on the addition of the potassium chlorate. This is of great importance in that the cost of production is very materially lessened, not only by the reduction of the reaction period, but by a material reduction of apparatuses which are necessary, especially when, as Vignon states, it takes twenty-four hours to complete the reaction.

I have discovered that the period of reaction or conversion of the cellulose can be greatly shortened by the addition of so small a proportion of potassium chlorate that a uniform oxidation according to the well-known equation

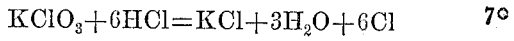

$$KClO_3 + 6HCl = KCl + 3H_2O + 6Cl$$

cannot possibly take place except at certain high temperatures and by the use of comparatively large quantities of potassium chlorate, when unmistakable phenomena of oxidation become apparent by the formation of ulmous bodies, while the complete conversion of the cellulose cannot be effected in a short time.

In the production of hydrocellulose as described in Beilstein, above referred to, the conversion of the cellulose is effected by means of hydrochloric acid of 21° Baumé and takes twenty-four hours and requires, necessarily, a correspondingly large plant when manufacturing on a commercial scale. On the other hand, if the hydrocellulose is produced by the process described by Girard, above referred to, and carried out at the preferred temperature of from 60° to 70° centigrade several hours are necessary to complete the conversion.

I have discovered that the reaction sets in immediately on the addition of potassium chlorate and that large quantities of cellulose can be converted into hydrocellulose in from one to one and one-half hours and a product obtained that differs not only from oxycellulose but from the hydrocellulose obtained by the reaction on cellulose with hydrochloric acid only.

In carrying out my novel process I proceed as follows: I charge a steam-jacketed vessel provided with stirring appliances with, say, one hundred kilograms of shredded cellulose, to which I add from eight hundred to one thousand kilograms of hydrochloric acid of commerce of about 21° Baumé and heat to from 60° to 70°. I then add a small proportion of finely-pulverized potassium chlorate, preferably in successive small doses of from ten to fifteen grains each, while the material is being stirred, until the whole proportion of the potassium chlorate, from one to two kilograms, has been added. The reaction will begin immediately after the first addition of chlorate and the conversion will be completed in from one to one and one-half hours. The proportion of chlorate and the duration of the reaction depend in a measure upon the character of the cellulose to be converted. Hard fibers require a little more chlorate and the conversion requires a little longer time than when softer fibers are converted. The completion of the reaction is shown by the mass becoming pulpy or mushy. It is then freed from acid by centrifugal action or otherwise, then thoroughly washed in water, dried at a temperature of about 70°, and is or may then be pulverized.

The acid separated from the cellulose may of course be used over and over again.

When pulverized, the hydrocellulose feels sandy or gritty, is white, and is practically indifferent to the action of acids and alkalies, properties which are not possessed by the oxycellulose, and in order to prevent the formation of oxycellulose in my process I use the above-described small proportions of potassium chlorate, the object being also to materially shorten the time of reaction and to obtain a product having properties not possessed by hydrocellulose when obtained by the usual processes.

The hydrocellulose obtained by my process has no aldehyde properties, in that it does not reduce either a solution of nitrate of silver nor a Fehling solution.

Whether an entirely new hydrocellulose is produced by my process I am at present not able to assert. The data obtained by an analysis of a carefully-purified sample of the hydrocellulose obtained by my process do not coincide with those set forth in *Comptes Rendus*, Vol. 61, page 1105, and differ characteristically from the new hydrocellulose recently described in the *Berliner Chemischen Berichte*, Vol. 32, page 2477. The complete insolubility of my product in alkalies and ammonia is a further proof that it is not oxycellulose nor a mixture of the latter with hydrocellulose. Finally the hydrocellulose obtained by my process behaves quite differently from that obtained by the Girard process at various temperatures, and also differs from hydrocellulose obtained by hydrochloric acid reaction only, which can therefore but approximately serve the purposes of the product obtained according to my process.

Having thus described my invention, what I claim as new therein, and desire to secure by Letters Patent, is—

1. The process of obtaining hydrocellulose, which consists in reacting upon cellulose with hydrochloric acid at a temperature of from 60° to 70° centigrade and with potassium chlorate in such proportions as to prevent the formation of oxycellulose, for the purposes set forth.

2. The process of obtaining hydrocellulose, which consists in reacting upon cellulose with hydrochloric acid at a temperature of from 60° to 70° centigrade and with potassium chlorate by addition of the latter in successive small doses and in such proportion as to prevent the formation of oxycellulose, substantially as set forth.

MAXIMILIAN CARL LUDWIG ALTHAUSSE.

Witnesses:
HERM. SCHMIDT,
MAX LEMCKE.